Figure 1:
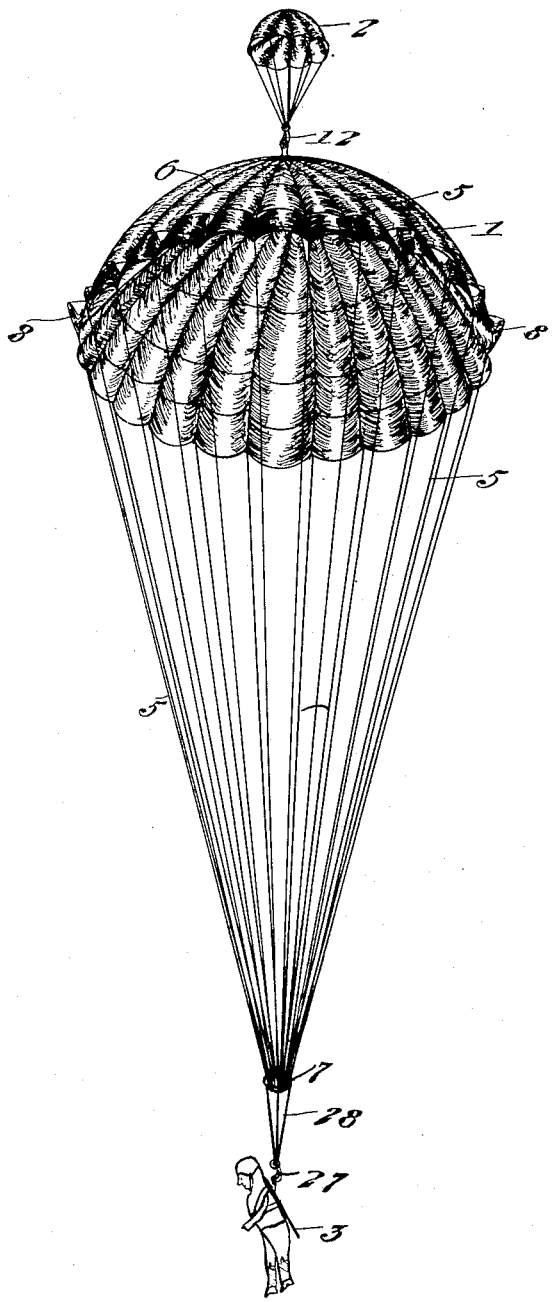

Sept. 23, 1924.  J. W. RUFF  1,509,410
SELF OPENING PARACHUTE
Filed July 22, 1919   5 Sheets-Sheet 1

WITNESSES

INVENTOR
J. W. RUFF,
BY
ATTORNEYS

Sept. 23, 1924.
J. W. RUFF
SELF OPENING PARACHUTE
Filed July 22, 1919 5 Sheets-Sheet 2
1,509,410
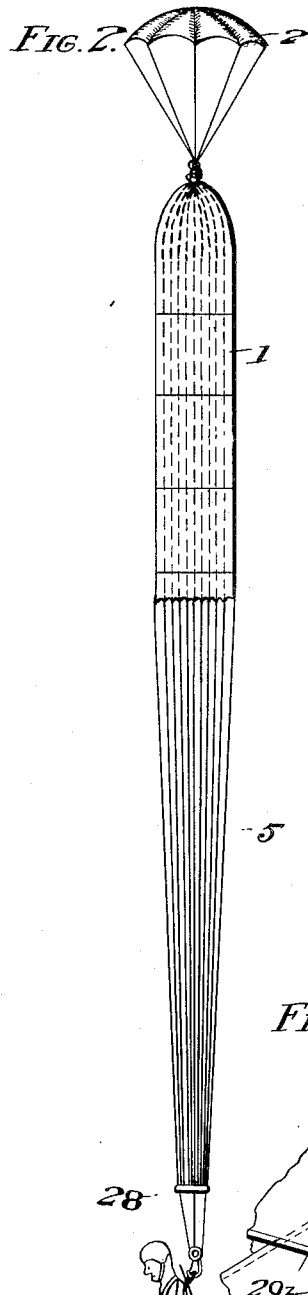
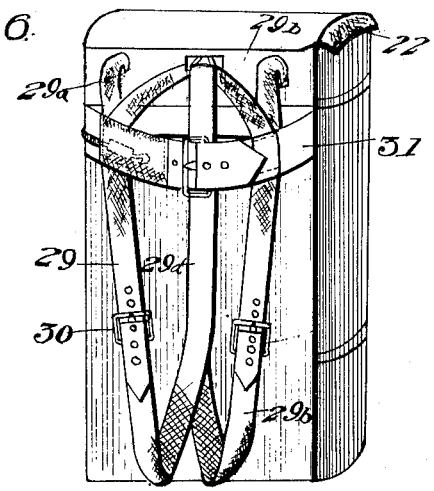
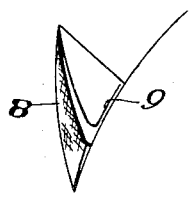
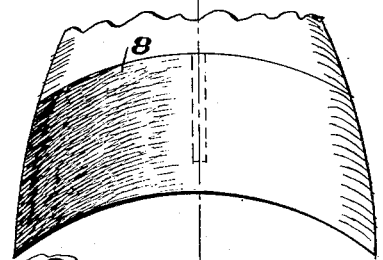
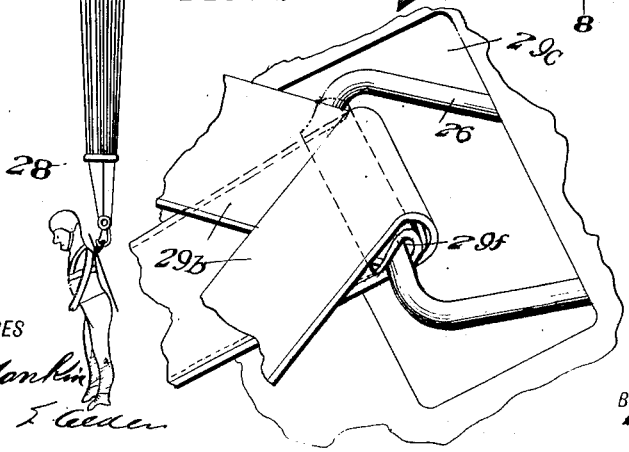
WITNESSES
INVENTOR
J. W. RUFF,
BY
ATTORNEYS

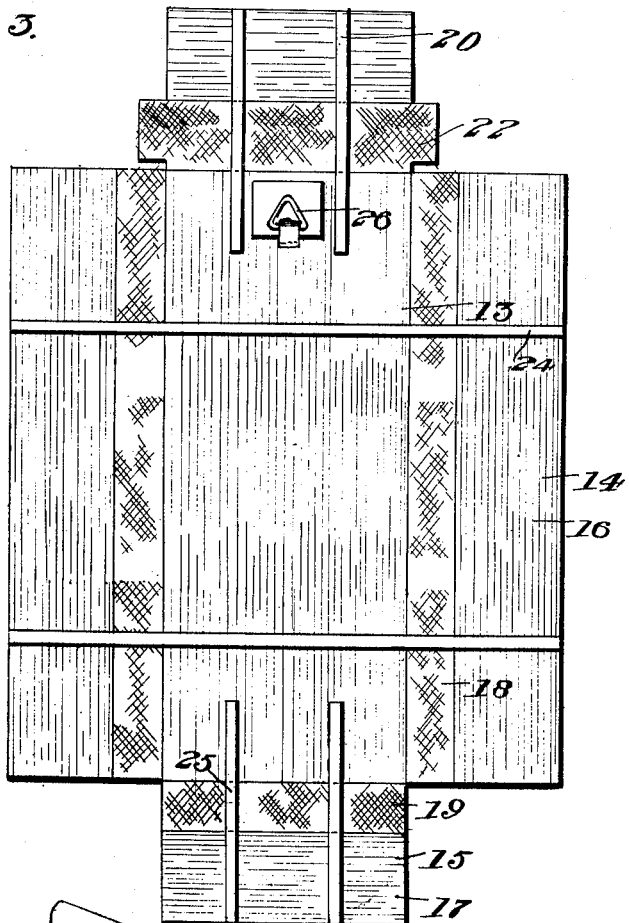
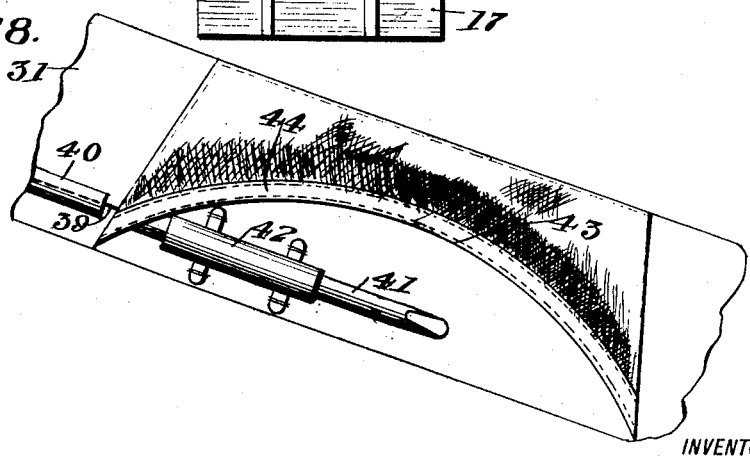

Sept. 23, 1924.
J. W. RUFF
1,509,410
SELF OPENING PARACHUTE
Filed July 22, 1919     5 Sheets-Sheet 4
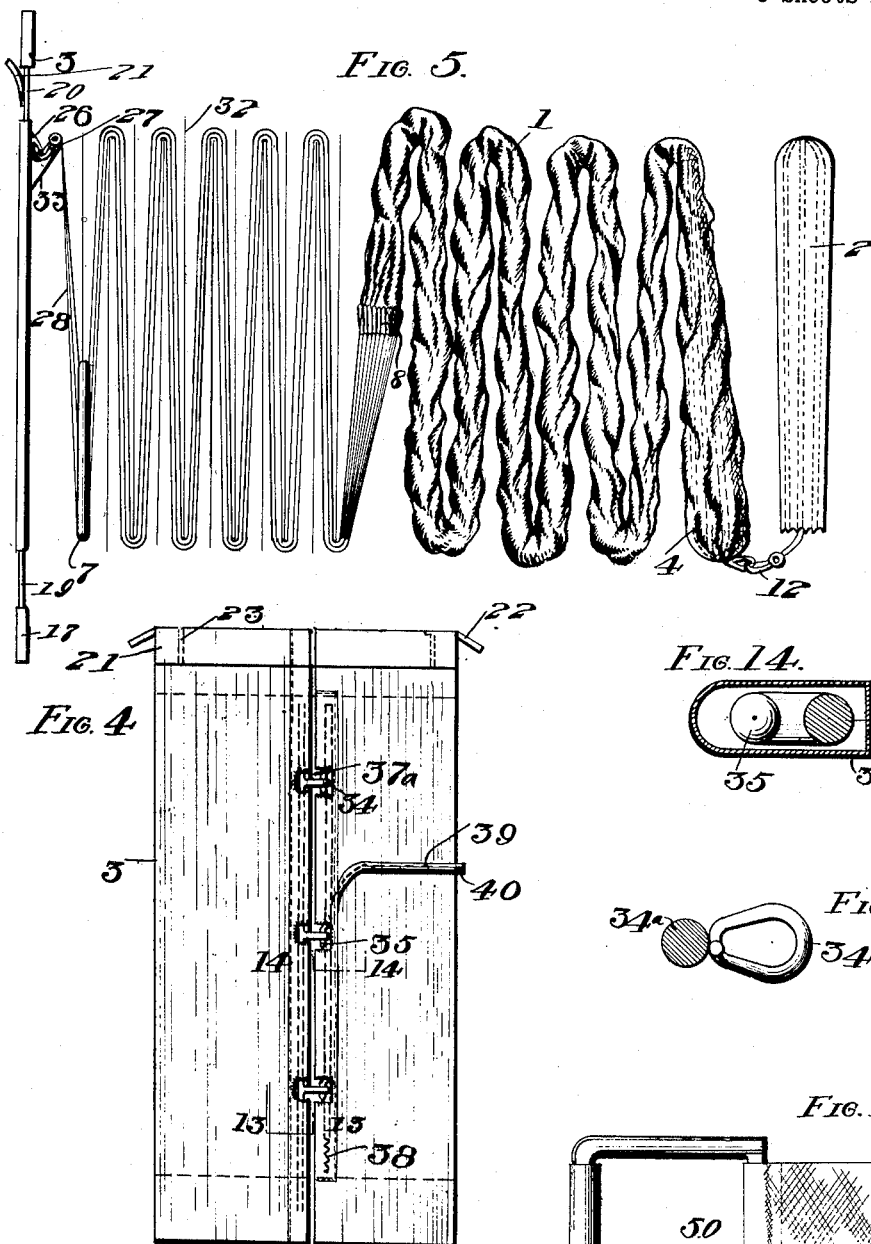

Sept. 23, 1924.  
J. W. RUFF  
SELF OPENING PARACHUTE  
Filed July 22, 1919  
1,509,410  
5 Sheets-Sheet 5
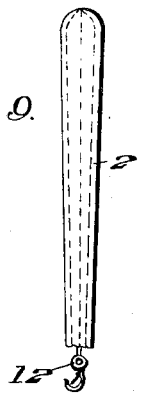
FIG. 9.
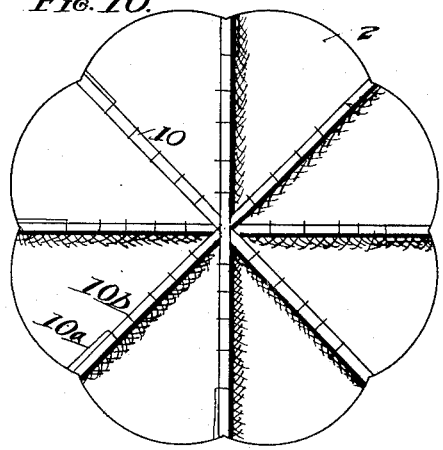
FIG. 10.
FIG. 11.
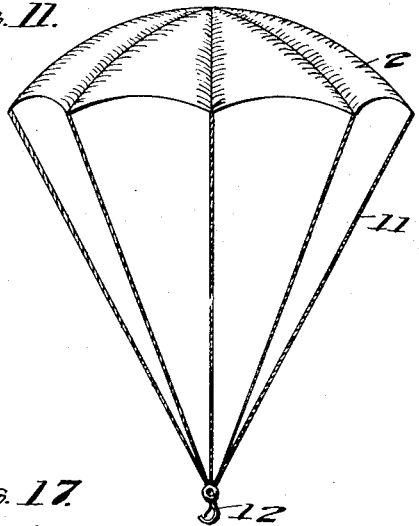
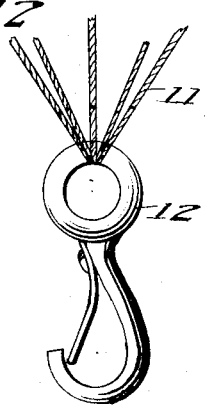
FIG. 12.
FIG. 17.
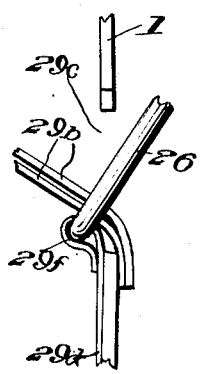
WITNESSES  
L. O. Mankin.
INVENTOR  
J. W. RUFF,  
BY  
ATTORNEYS Patented Sept. 23, 1924.

1,509,410

UNITED STATES PATENT OFFICE

JOHN WITHERS RUFF, OF CHARLESTON, SOUTH CAROLINA.

SELF-OPENING PARACHUTE.

Application filed July 22, 1919. Serial No. 312,488.

*To all whom it may concern:*

Be it known that I, JOHN W. RUFF, a citizen of the United States, and a resident of Charleston, in the county of Charleston and State of South Carolina, have invented certain new and useful Improvements in Self-Opening Parachutes, of which the following is a specification.

This invention relates to an improvement in self opening parachutes, and more particularly to the type designed for the use of aviators and pilots of dirigible airships, and one of the principal objects of the invention is to provide a device of the type indicated which will be exceedingly positive and reliable in action, requiring slight effort on the part of the aviator to bring it into action.

Another object of the invention is to provide a self opening parachute including a main parachute for retarding the fall of the aviator, and a means in the nature of a pilot parachute for the purpose of unfolding the main parachute from its case and supporting the main parachute in such a position that the air currents will not fail to open it.

Another object of the invention is to provide a self opening parachute and a case therefor, the device being so constructed that it may be attached to the back of the aviator and be brought into play irrespective of whether the aviator is in his machine or whether he has jumped therefrom. This case with its enclosed parachute forms a unit with the aviator and is in no way attached by cords or other means to the airplane or dirigible, thereby reducing the liability of the parachute fouling with the airplane or dirigible in case of accident of any kind which would compel the aviator to jump from the machine.

Another object of the invention is to provide a device of the nature set out which is exceedingly compact, of relatively small weight, simple, durable, efficient in operation, and inexpensive to manufacture.

With these and other objects in view and which will be apparent as the description proceeds, the invention resides in the construction, combination and arrangement of parts hereinafter more fully described and claimed, and illustrated in the accompanying drawings in which like characters of reference indicate like parts throughout the several views of the drawings, in which:

Figure 1 indicates an elevational perspective view of an apparatus constructed according to my invention, showing the same in operation, Figure 2 is an elevational view showing the position of the main parachute immediately before opening, Figure 3 is a plan view of the case in which the parachutes are carried, the case being in open position, Figure 4 is a plan view of the case, the same being closed, Figure 5 is an elevational view indicating the manner in which the parachutes and appurtenances are folded prior to packing in the case, Figure 6 is a perspective view showing the straps for strapping the case to the body of an aviator, Figure 7 represents an elevational view of one of the stabilizing pockets, Figure 8 represents a sectional view on the line 8—8 of Figure 7, Figure 9 represents an elevational view of the pilot parachute, showing the same in closed or folded position, Figure 10 represents an inside plan view of the pilot parachute, Figure 11 represents a side elevational view of the pilot parachute showing the same in open position, Figure 12 represents a detail view of one of the snap hooks with which the pilot and main parachutes are equipped, Figure 13 represents a view in section taken on the line 13—13 of Figure 4, showing one of the eyes, Figure 14 represents a view in section taken on the line 14—14 of Figure 4 showing one of the hooks for engaging the eyes, Figure 15 represents a plan view of one of the buckles, Figure 16 represents a view in perspective of the means for attaching the triangular eye to the case, Figure 17 represents a fragmentary sectional view taken through the upper portion of the back of the case, Figure 18 is a view in elevation showing the operating bolt mounted on the breast strap, and showing the shield for protecting the bolt.

In general, the invention includes a main parachute 1, whose purpose is to retard the fall of the aviator, a pilot parachute 2, the function of which is to unfold the main parachute from its case and hold it or suspend it in such position that it will open by movement through the air, and a case 3 adapted to be strapped to the aviator, and in which case the parachutes are folded when not in operation.

The main parachute 1 may if desired, be of ordinary standard design, but should be made of material such as silk that would have light weight, small bulk, soft pliable texture, and great strength. Instead of the parachute of ordinary design, I prefer to use a construction whereby the main parachute is assisted in being opened by a number of spring ribs 4 arranged at the apex of the parachute, and which comprise a plurality of radially extending strips of spring material, each strip forming opposite ribs. When the parachute is folded, these ribs simply are bent at their middle portions, and thus being placed under tension, tend to open the parachute when the latter is released from the case. I reserve the right to use, instead of these radial springs at the apex, a spread ring at the apex of the same size as the spread ring at the lower end of the cords. The function of either the springs or the ring being to spread out or separate the folds of the main parachute and cords so as to facilitate the entrance of air and the opening of the main parachute. To give added strength to the parachute, the radial seams are reinforced with strong light cords 5 of small diameter, these cords being tied together at intervals by the cords 6 which extend around the parachute as indicated in Figure 1.

The bottom ends of the cords which are attached to or extend from the periphery of the parachute, are fastened to a spread ring 7, of a diameter slightly less than the width of the case (when closed), in which the parachutes are packed. The object of utilizing this ring is to separate the cords, prevent their tangling, and slightly extend the mouth of the parachute when it is released, to facilitate the ready opening of the parachute. It may here be noted that the spring ribs 4 are relatively short, so that the parachute when folded may be packed in the case. The length of the ribs is somewhat less than the length of the case, for this purpose.

While I may if desired, equip the main parachute with a central air vent, to prevent oscillation, preferably I desire to omit the air vent, and use stabilizing pockets instead. These pockets indicated at 8 are arranged around the periphery of the parachute, and open toward the apex, doubled springs 9 of U-shape being inserted between the pockets and the body of the parachute, to facilitate these pockets in opening when the parachute is released. The purpose of the stabilizing pockets is to prevent any undue oscillation or swaying of the parachute as it descends, the arrangement being such that any tendency of the parachute to oscillate will cause the pockets to pull against the air, thus retarding and minimizing the tendency of the parachute to move from its normal position. The action of these pockets being somewhat similar to that of the bilge keel on a vessel.

The advantage of omitting the central air vent lies in the fact that a parachute of given size will offer more resistance in falling, and hence fall slower, and further by eliminating the central vent, the air will more quickly cause the parachute to open up as it drops.

The stabilizing pockets are preferably made of the same material as the parachute, and while I have shown them placed at the periphery of the parachute, I may if desired, locate them between the apex, and the periphery and may arrange them so that their mouths will open either toward the periphery or the apex of the parachute. These pockets may be located on the inside of the parachute if desired. As shown in Figure 1, the pockets consist of a continuous series, with their ends touching, and with their mouths opening toward the apex of the parachute. This construction is obtained by simply stitching a strip of material around the parachute at its lower edge, leaving the upper edge of the strip unconnected from the parachute, and then stitching the strip to the parachute along the seams of the latter. These pockets may consist of individual units located at intervals, instead of being formed of a continuous band, if so desired. The stabilizing pockets may if desired, also be placed on the pilot parachute.

The pilot parachute consists of a small umbrella like parachute of silk or other suitable cloth, and is equipped with ribs 10 preferably of flat spring material, these ribs being adapted to be bent or folded at their central portions at the apex of the parachute when the latter is packed in the case, the ribs thus being under sufficient tension to insure the parachute springing open when it is detached or freed from the case. Each spring thus in reality forms two ribs, the springs being crossed at their central portions as indicated in Figure 10. The length of the ribs is such that when the parachute is folded it will readily fit into the case.

The ends of the spring ribs extend into pockets, 10ª formed of suitable material and stitches of cord can be arranged across the spring ribs for holding them in the proper position, or the spring ribs may be encased in a tube or duct of cloth which is stitched to the parachute, preferably on the inside.

At the end of each rib is attached a cord 11, the length of the cord being about twice the length of the rib. The outer ends of these cords are brought together at a common point and fastened to a suitable spring catch or snap hook 12. This snap hook detachably engages a loop or other suitable fastening means secured at the apex of the main parachute, as clearly indicated in the drawings. This snap hook should be encased in a cloth envelope, the mouth or open end of which is kept closed by a rubber band, or by draw-strings, the object of the snap hook envelope being to prevent the snap hook from tangling in the cords of the main parachute.

The case or container, in which the pilot and main parachutes are kept while not in use, includes a rectangular base or bottom 13, side flaps 14, and end flaps 15. The case is made of canvas or other suitable material, which should be both fire and water proof, and the back or bottom of the case is reinforced with fibreboard or other suitable substance so as to be relatively strong and stiff. The outer edges or sections 16 of side flaps 14, and outer portions 17 of end flaps 15 are similarly reinforced, the unreinforced inner borders of the side and end flaps thereby forming flexible hinges 18 and 19, respectively, about which the reinforced portions of the flaps may be swung, in folding the side and end flaps one upon the other when parachutes are packed in the case.

The ends of the hinged portion of the upper flap are extended as at 22, to overlap the upper ends of the hinges 18 of the side flaps 14, in order to assist in protecting the contents of the case from the weather. To further effect this object, a rain shield consisting of a strip of canvas stitched or otherwise secured at one edge to the outer edge of the top hinge 19, that is, to the edge of the hinge adjoining the reinforced flap, is provided. This rain shield 21 falls over the upper edges of the side flaps of the case when the latter is packed and closed, while the end portions or ears 22 of the rain shield extend over the upper ends of the hinges of the side flaps at the sides of the case. Springs 23 stitched or otherwise secured in the cloth, holds the rain shield 21 snugly down over the upper ends of the side flaps. At the same time, however, they do not prevent the ready opening of the side flaps when the parachutes are to be released.

Cross springs 24 serve to normally maintain the side flaps co-planar with the back or base 13, and other springs 25 serve to maintain the end flaps in similar relation to the base. Thus normally under the tension of the springs, the whole case when open, will present a flat surface. However, when the parachutes are packed within the case, the side and end flaps are folded in against the tension of the springs 24 and 25. The springs are of such material and strength as to allow the flaps to be readily folded in one upon the other when closing the case.

Adjacent the upper end of the back 13 is arranged a triangular or otherwise suitably shaped metal eye or ring 26, and to this ring or eye the lower end of the main parachute is connected by means of a snap hook 27. This hook is connected to the ring 7 by means of cords 28.

The case is adapted to be secured upon the back of the aviator, by means of harness consisting of suitably arranged straps indicated generally at 29 secured to the outer side of the back 13 of the case, and passing over the shoulders and beneath the thighs of the aviator, the ends of the straps being connected by buckles 30 as shown in Figure 6. A breast strap 31 buckles around the breast of the aeronaut underneath the shoulders, such strap being stitched intermediate its ends to the back of the case at right angles to the strap 29$^d$, hereinafter described.

The inner ends of the straps 29 are bifurcated, one arm 29$^a$ being stitched to the back of the case on the outer side of said back, the other arm 29$^b$ being passed through an opening 29$^c$ formed in the back of the case and being stitched to the inner side of the back.

Straps 29 include a length of material 29$^d$ stitched longitudinally upon the outer surface of the back, which length of material at its lower end is bifurcated to form straps 29$^e$ carrying the buckles 30 through which the ends of the straps 29 are engaged. The upper end of the strap 29$^d$ is looped to form an eye 29$^f$ which carries the metallic triangular eye or ring 26. This eye or ring as indicated in Figure 16 extends into the case through the opening 29$^c$. The ends of the arms 29$^b$ of straps 29 pass over the eye 29$^f$ as indicated in Figure 16. In this manner, stresses placed upon the metallic eye or ring 26 are transmitted directly to the harness, and thus the material of the case is relieved from direct strain, while the apparatus is in operation.

The fingers of the buckles are spring tensioned, as indicated in Figure 15, so that when the ends of the straps are pulled by the aviator, the fingers will be withdrawn from the eyes or openings in the straps, thus allowing the aviator to quickly free himself from the harness upon alighting. The advantage of this arrangement lies in the fact that were it not possible for the aviator to quickly free himself, there would be danger, in case of a high wind, of him being dragged or being battered along the ground while attempting to disengage himself from his harness.

As shown in Figure 15, the finger of the buckle has the outer end of a coil spring 50 attached to it in any suitable manner, the inner end of such spring being connected to a cross pin 51 stitched or otherwise secured to the material of the strap.

In packing the parachute, the case is laid flat, and the parachutes and their cords are laid fold upon fold, as indicated in Figure 5, care being taken not to tangle up the cords, and to so arrange them as to lie in a compact flat position. If desired, sheets of paper or other suitable material 32 may be placed between the folds of the cords in order to prevent them becoming entangled. The ring or eye 26 is overlaid by a flap or pocket 33 which is to prevent the entanglement of the cords 28 and cords 5 with the snap hook 27 or with the ring or eye. In folding the parachute, the spread ring 7 at the lower end of the cords of the main parachute is placed against the back of the case in the lower portion thereof, the cords then folded in the manner indicated with sheets of paper between their folds to prevent tangling, the main parachute then folded in upon the cords, and finally the pilot parachute is folded in place.

In packing the latter, the cords are preferably folded up inside of the parachute, the snap hook 12 however being exposed below the lower end of the parachute, so that there will be no danger of the snap hook being entangled with the cords of the parachute when the device is brought into play. The upper section of the main parachute containing the spring ribs 4 from a fold of itself, being the last portion of the main parachute to be folded in position, the pilot parachute being placed on top of this section of the main parachute. The parachutes having been folded upon the back 13 in the manner described, the end flaps 15 are then folded downward, and the side flaps then folded over, thus retaining the end flaps in position.

A fastening device for the case is carried upon the adjacent edges of the side flaps 14, and includes a series of eyes 34 arranged adjacent the edge of one flap, these eyes being adapted to be engaged by hooks 35 carried on a sliding bolt 36. This sliding bolt is arranged in a suitable metallic guide or tube 37, and when the case has been packed and closed, the bolt is moved into such position that the hooks 35 are engaged with the eyes 34, the side flaps being thus secured together, it being noted that the bolt 36 is carried by one side flap while the eyes 34 are carried by the other. A spring 38 connected at one end to the bolt and at its other end to the side flap on which the bolt is carried, will retain the hooks 35 in engagement with the eyes 34, until the bolt is forcibly raised.

In order that the aviator may raise the bolt for disengaging the hooks, a flexible cord or wire 39 connected at one end to the bolt 36, is passed through a section of flexible tubing 40 extending along the breast strap 31, and terminates in an operating handle 41 arranged in a guide 42 on the breast strap 31 in position to be easily engaged by the right thumb of the aviator and pulled, in order to release or withdraw the bolt 36. A suitable shield 43 made of canvas or other material overhangs the bolt 41 and prevents it from being accidentally moved. This shield is supported by a spring 44 so that its lower edge overhangs the bolt and protects the same. The end of the bolt may be curved or hooked to form a means whereby the thumb of the aviator may engage the bolt 41, for readily moving it, when the sliding bolt 36 is to be withdrawn.

The eyes 34 are formed on a rod 34ª, which is rotatably mounted in a loop in the material forming one of the side flaps of the back. The metallic casing 37 in which the bolt 36 slides is carried in a loop of the material forming the other side flap of the casing. The hooks 35 are exposed when engaging the eyes 34 through openings 37ª provided in the casing 37. It should be noted that these hooks and eyes do not have any exposed points that may tangle in the cords or folds of the parachute when the latter are in the act of unfolding.

Before making the ascent, the aviator packs his parachute in the following manner: The case is laid in its open position on a flat surface, the spring catch at the lower end of the cords of the main parachute is then hooked into the eye 26 of the case, and the cords of the main parachute and the main parachute itself are folded down upon the case in the manner described. The pilot parachute is then folded, preferably with the cords inside, and the spring catch 12 at the ends of the cords is engaged in the loop at the apex of the main parachute, and the pilot parachute is then folded down upon the main parachute in the manner shown. While the pilot parachute is held in folded or closed position, the end flaps of the case are folded over, and then the side flaps folded in, engaging the end flaps and holding them in position. The hooks 35 of the sliding bolt 36 are then engaged in the eyes 34, retaining the two side flaps in coupled or fastened position. The rain shield is then slipped over the upper end of the side flaps, thus keeping rain out of the case. The case containing the main parachute and the pilot parachute is then strapped onto the back of the aviator.

Should the aircraft in which the aviator is riding become disabled or catch on fire while aloft, and the aviator see he cannot bring it to ground safely, he has only to jump clear of the machine and jerk the operating bolt or handle 41 with his thumb. This jerk releases the bolt 36, the springs 24 and 25 are then allowed to expand, opening up the side and end folds or flaps of the case, and releasing the pilot parachute which is immediately opened up and thrown out of the case by the action of the radial spring ribs. It will be noticed that while the rain shield is held down in position, normally through the medium of its springs 23, these springs are not strong enough to prevent or in any way hinder the opening of the flaps of the case when the bolt 36 is released.

The pilot parachute having been opened, begins to float in the air, thereby trailing off the main parachute by its apex, as the aviator and the case fall rapidly to earth. As soon as the main parachute is trailed or drawn out into a position vertically above the aviator, as shown in Figure 2, the spring ribs at the apex of the main parachute tend to spread it out (or in case a spread-ring is used at the apex of the main parachute instead of spring ribs, it, the spread ring, will tend to separate the vertical folds of the main parachute) and the spread ring 7 at the bottom of the cords 5 will tend to open up the mouth of the parachute sufficiently to allow the air to enter, thus opening the parachute to its full extent, and allowing it to check and retard the fall of the aviator to a safe speed. The parachute in descending is prevented from undue rocking or oscillation in any direction by the resistance offered by the stabilizing pockets, to such rocking or oscillation.

As soon as the aviator has landed, particularly if there be a strong wind blowing, he may pull the ends of the harness straps. The fingers of the buckle will immediately be disengaged from the straps, and the aviator may then let go the ends of the straps and allow them to slide through the buckles, thus disengaging himself from his harness by simply withdrawing his arms from the straps which pass over his shoulders.

Although I have described the preferred embodiment of my invention, I may desire to make such changes in the construction, combination and arrangement of parts thereof as do not depart from the spirit of the invention and the scope of the appended claims.

I claim:—

1. In a device of the class described, the combination of a case consisting of a normally flat base or back having co-planar spring controlled extensions or flaps adapted to be folded inwardly on the base to form a closure for the case, the spring tensioned locking means for maintaining the flaps in closed position, and flexible means cooperating with said spring tensioned locking means whereby the same may be moved into position for releasing the flaps from the front of the operator.

2. In a device of the class described, a case comprising a flat base member adapted to be strapped to the back of the operator, spring tensioned side flaps adapted to normally lie in the same plane as the base and end flaps adapted to be folded one upon another for closing the case, spring actuated means for normally locking the case in closed position, and means operable at will at the front of the operator for moving said spring actuated locking means into position for unlocking the case.

3. A parachute comprising a sustaining body having a series of stabilizing pockets extending entirely around the outer edge thereof, and spring means to urge the pockets to open position.

4. In a device of the class described, the combination of a main parachute, a pilot parachute connected thereto, a case in which the parachutes are packed, said case being normally held in open position, means for holding the case in closed position, and means for flexibly connecting the parachute to the back wall of the case, said means including a ring connected to the back wall of the case, and a flap covering said ring to prevent fouling of the ring and parachute when unfolding.

5. A collapsible parachute comprising a sustaining body and a plurality of spring ribs connected thereto and being crossed at the center of the sustaining body, cords connected to the sustaining body, and a spreader ring connected to said cords and aiding in the initial opening of the sustaining body and the spring ribs connected thereto.

6. In a device of the character specified, a parachute and a series of upwardly opening stabilizing pockets symmetrically arranged thereon adjacent the periphery thereof.

7. In a device of the character specified, a parachute having upwardly and outwardly opening stabilizing pockets thereon.

8. A parachute pack comprising a rigid body having flaps adapted to enclose a parachute, eyes carried by one of the flaps, a locking bolt slidably carried by another flap and having hooks to engage said eyes, spring means to normally hold said hooks in engagement with said eyes and a manually controlled member connected to sail bolt for operating the same.

9. A parachute pack comprising a rigid body having flaps adapted to enclose a parachute, eyes carried by one of the flaps, a locking bolt slidably carried by another flap and having hooks to engage said eyes, spring means to normally hold said hooks in engagement with said eyes and a manually controlled member connected to said bolt for operating the same, there being means to protect said bolt from engagement with the parachute during the opening of the latter.

10. The combination with a main collapsible parachute, of a pilot parachute for straightening the main parachute and consisting of a collapsible body, and a plurality of ribs crossed at the center of the body and adapted to be bent intermediate their ends when the body is collapsed and adapted to straighten when the body is released to open the body, and means connecting the main and pilot parachutes.

JOHN WITHERS RUFF.